United States Patent [19]

Dauvergne

[11] 4,305,251

[45] Dec. 15, 1981

[54] ASSISTED BRAKING DEVICE

[75] Inventor: Jean L. R. Dauvergne, Fosses, France

[73] Assignee: Societe Anonyme Francaise du Ferodo, Paris, France

[21] Appl. No.: 117,484

[22] Filed: Feb. 1, 1980

[30] Foreign Application Priority Data

Feb. 6, 1979 [FR] France .............................. 79 03030

[51] Int. Cl.$^3$ ............................................. B60T 13/20
[52] U.S. Cl. ........................................ 60/551; 60/594
[58] Field of Search ............... 60/550, 551, 594, 547 R

[56] References Cited

U.S. PATENT DOCUMENTS

| 2,229,247 | 1/1941 | Kamenarović | 60/551 |
| 2,846,031 | 8/1958 | Kelley | 60/550 |
| 2,934,042 | 4/1960 | Stelzer | 60/551 |
| 2,976,849 | 3/1961 | Stelzer | 60/550 |
| 3,382,676 | 5/1968 | Tenniswood | 60/551 |
| 3,707,075 | 12/1972 | Cripe | 60/550 |
| 3,808,817 | 5/1974 | Bennett | 60/550 |

FOREIGN PATENT DOCUMENTS 1436608 8/1965 France .
456356 2/1966 Switzerland .

Primary Examiner—Abraham Hershkovitz
Attorney, Agent, or Firm—Young & Thompson

[57] ABSTRACT

The invention relates to a power-assisted braking device of the kind having a master piston sliding in a master cylinder, a jack having a piston linked to the master piston by an interconnection such as a rod, a source of auxiliary hydraulic pressure, and a distributor which feeds the jack with auxiliary hydraulic pressure and which is operated by a brake pedal and two mutually articulated levers. The unit consisting of these two levers cooperates with a fixed point and has three working points of which the first cooperates with the pedal, the second cooperates with the distributor and the third cooperates with the master piston. According to the invention, the first and second working points are located on one of the levers (the primary lever) and the fixed point and the third working point are located on the other lever (the secondary lever). This enables the distributor to be acted on directly by the pedal thereby providing more precise operation.

10 Claims, 10 Drawing Figures

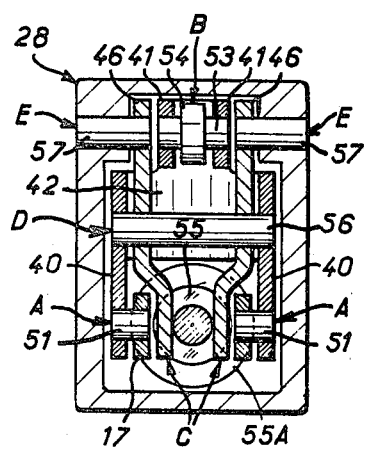

ASSISTED BRAKING DEVICE

BACKGROUND OF THE INVENTION

The present invention relates to an assisted braking device comprising a master piston mounted to slide in a master cylinder, a jack having a piston linked to the master piston by interconnecting means, a source of auxiliary hydraulic pressure, and a distributor which is suitable for feeding the jack with auxiliary hydraulic pressure from the said source and is controlled in response to the actuation of control means comprising a pedal and two mutually articulated levers, in which device the unit consisting of these two levers cooperates with a fixed point and has three working points of which the first cooperates with the pedal, the second cooperates with the distributor and the third cooperates with the master piston.

Compared with the devices with a single lever, these devices with two levers exhibit the advantage that they make it possible to choose an optimum step-down ratio, in particular in the event of failure of the auxiliary system, whilst at the same time satisfying other desirable conditions of construction and operation and in particular the extremely desirable condition of small size.

In general, in these devices with two levers, the working point cooperating with the pedal, and the fixed point, are located on one of the two levers, whilst the working point cooperating with the distributor and the working point cooperating with the master piston are located on the other lever. As a result, a large number of articulations are involved in the control of the distributor by the pedal.

The present invention relates to an assisted braking device of the type indicated above, which does not suffer from this disadvantage and in which the control of the distributor by the pedal is direct and hence precise.

SUMMARY

According to the invention, an assisted braking device of the kind described above is characterised in that the working point cooperating with the pedal and the working point cooperating with the distributor are located on one of the two levers, referred to herein as the primary lever, whilst the working point cooperating with the master piston, and the fixed point, are located on the other lever, referred to as the secondary lever.

By virtue of this arrangement, the distributor, which has a short stroke, is acted upon directly by the pedal, thus increasing the precision of operation and permitting excellent conditions for the actuation of the master piston by the auxiliary system.

Preferably, the primary and secondary levers are each in the form of a yoke having a pair of side cheeks joined by a crosspiece, the cheeks having holes which receive articulation axles.

More particularly, the primary lever has two pairs of superposed side cheeks with different spacings, between which the pair of cheeks of the secondary lever, with an intermediate spacing, are inserted.

By virtue of this arrangement, a particularly simple and robust construction is obtained.

BRIEF DESCRIPTION OF THE DRAWINGS

FIG. 6 is a view of the device in transverse vertical section along the broken line VI—VI of FIG. 4;

FIG. 7 is a perspective view of the unit consisting of the primary lever and the secondary lever, in the mounted position;

FIG. 8 is a similar view to FIG. 7, but in exploded perspective;

DESCRIPTION OF THE PREFERRED EMBODIMENTS

Figure 1:
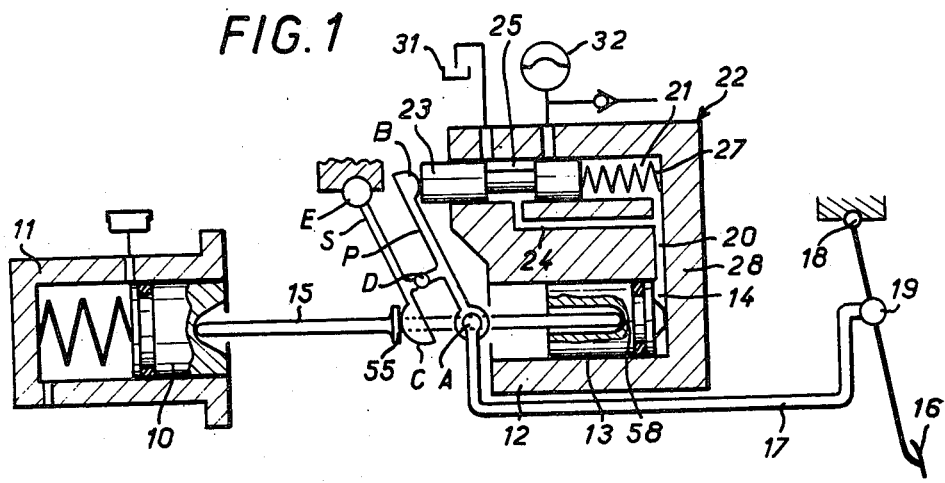
FIG. 1 is a schematic view of a device, according to the invention, in the rest position.

Reference will be made to FIGS. 1 to 8, which relate, by way of a non-limiting example, to the application of the invention to the braking circuit of a motor vehicle.

An assisted braking device according to the invention comprises (FIG. 1) a master piston 10 slidably mounted in a master cylinder 11.

A jack 12 is axially aligned with the master cylinder 11 and comprises a piston 13 defining a chamber 14. The piston 13 is linked to the master piston 10 by axially aligned interconnecting means. These means consist of a rod 15.

Control means are provided and these comprise a pedal 16 mounted so as to pivot at 18, a connecting rod 17 articulated at 19 on the pedal 16, and lever means P,S.

The hydraulic chamber 14 of the jack 12 is connected by a passage 20 to a chamber 21 of a distributor 22, the slide valve of which is shown at 23.

The chamber 21 is defined by the end of the slide valve 23 and communicates with an intermediate annular groove 25 in the slide valve 23 by means of a channel 24.

The slide valve 23 is subjected to two opposing forces, one of which is developed by the end B of the lever P of the lever means, P,S and tends to push it towards the right-hand side of FIG. 1, and the other of which is developed by the hydraulic pressure of the chamber 21 and tends to push it towards the left-hand side of FIG. 1. 27 shows a return spring of low stiffness, which tends to bring the slide valve 23 back towards the left-hand side of FIG. 1.

Figure 2:
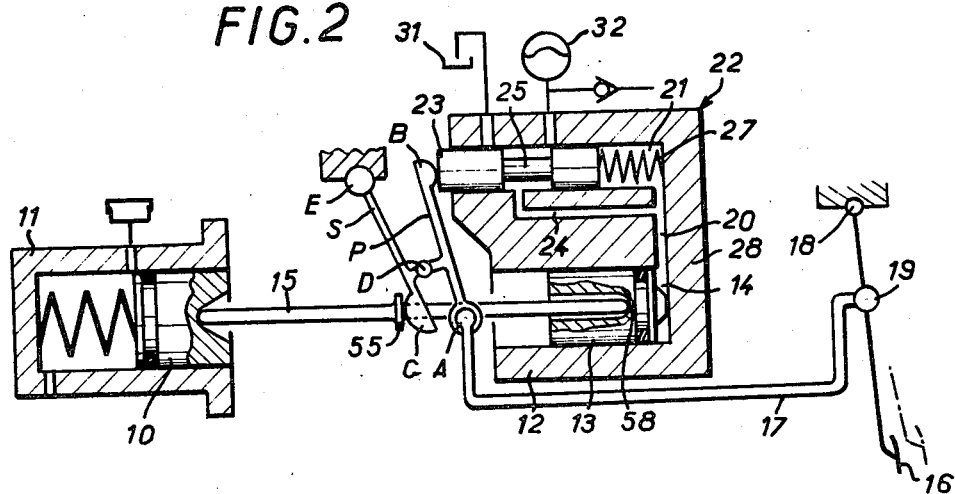
FIG. 2 is a similar view to FIG. 1, but in which the pedal is partially depressed and enables the distributor to provide hydraulic feed to the auxiliary jack.
Figure 3:
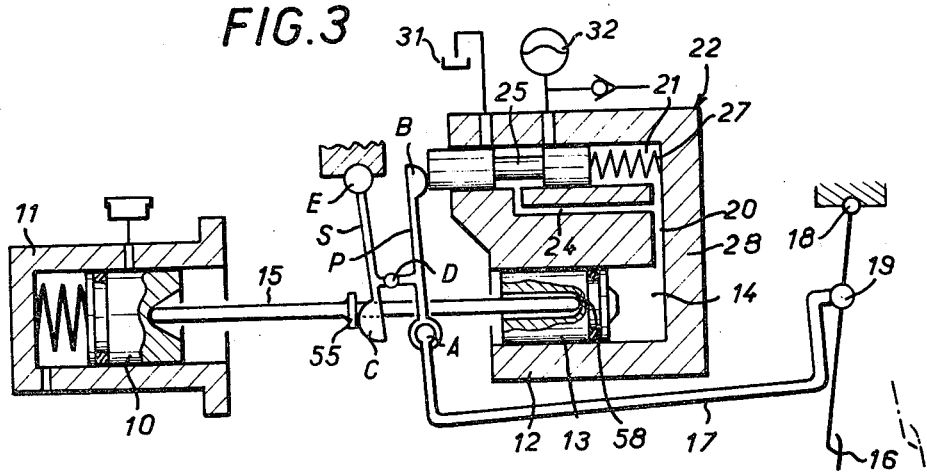
FIG. 3 is a similar view to FIG. 1 and FIG. 2, but in which the hydraulic jack is actuated and pushes the master piston.
Figures 4, 5:
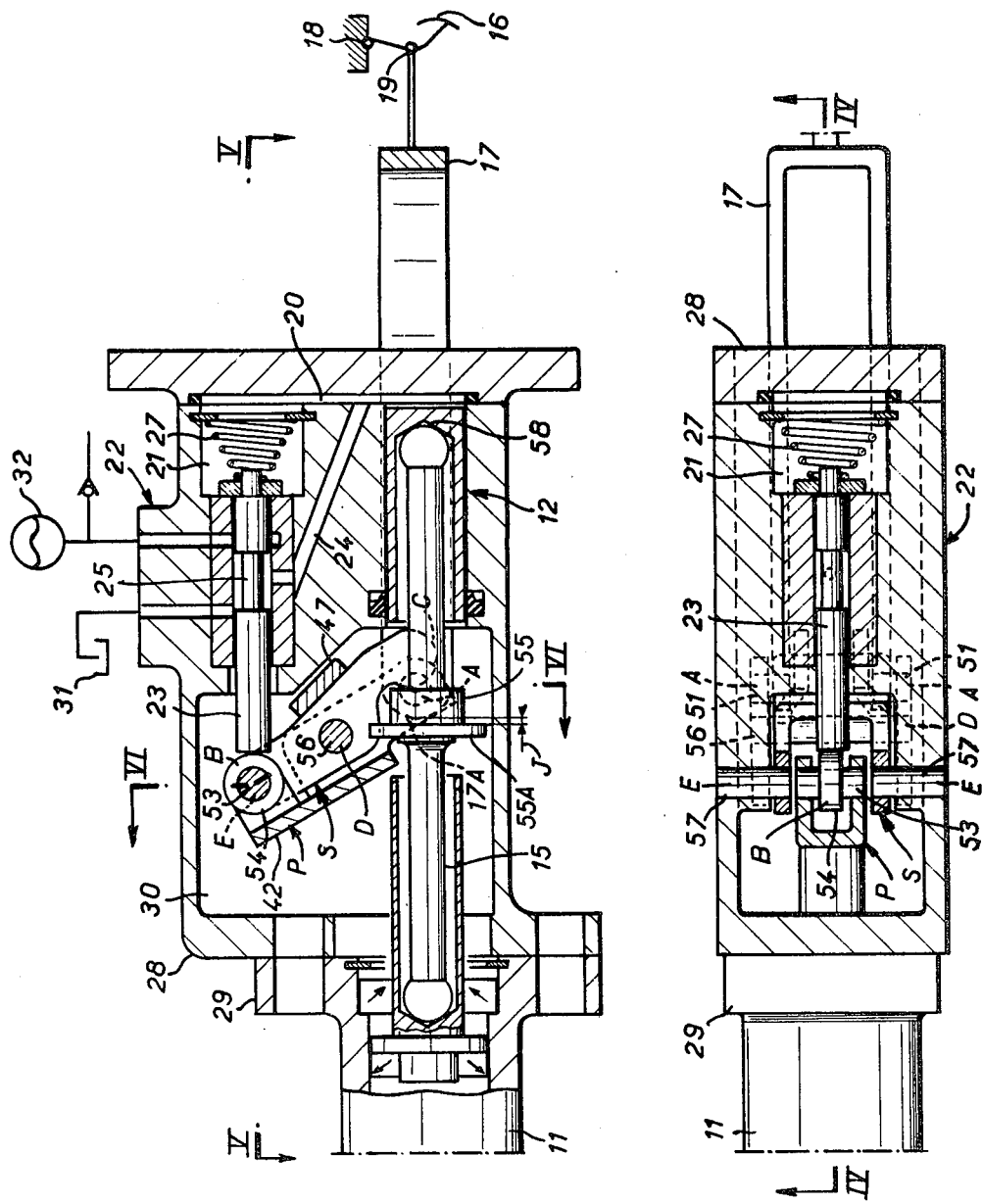
FIG. 4 is a view of the device, according to the invention, on a larger scale, in longitudinal vertical section along the line IV—IV of FIG. 5.
FIG. 5 is a corresponding view in horizontal section along the line V—V of FIG. 4.

The jack 12 and the distributor 22 have a common body 28 (FIGS. 1 to 6) which is fixed to a collar 29 on the master cylinder 11 (FIGS. 4 and 5).

This common body 28 has the general shape of a parallelepipidal casing in which, in front of the piston 13 and the slide valve 23, which are superposed, there is a free space 30 receiving the rod 15 and the lever means P,S.

Depending on the position of the slide valve 23, the annular groove 25 in the slide valve 23 of the distributor 22 can be brought into communication either with a reservoir 31 (FIG. 1) or with a source of auxiliary hydraulic pressure 32 (FIG. 2), for example a pressure accumulator associated with a pump; alternatively, it can be totally isolated (FIG. 3).

The lever means P,S have three working points. The first working point A cooperates with the pedal 16 via the connecting rod 17. The second working point B cooperates with the slide valve 23 of the distributor 22. The third working point, designated by C, cooperates with the interconnecting rod 15.

More particularly, the lever means comprise a primary lever P and a secondary lever S. The levers P and S are mutually articulated at an intermediate point of articulation D. The first and second working points A and B are at the respective ends of the primary lever P. A fixed fulcrum E and the third working point C are at the respective ends of the secondary lever S.

As shown more particularly in FIGS. 7 and 8, the primary lever P is in the form of a yoke having two pairs of superposed side cheeks 40 and 41, with different spacings, which are joined by a crosspiece 42. Each cheek 40 has two holes 43 and 44. Each cheek 41 has a hole 45.

The secondary lever S is also in the form of a yoke, but with a single pair of side cheeks 46 joined by a crosspiece 47. The spacing of the cheeks 46 of the secondary lever S is intermediate between that of the cheeks 40 and that of the cheeks 41 of the primary lever P, so that the cheeks 46 can be inserted between the cheeks 40 and 41 of the primary lever P (FIG. 7).

Each cheek 46 of the secondary lever S has two holes 48 and 49. Moreover, the cheeks 46 of the secondary lever S possess heels 50.

Assembly is as follows.

The holes 43 in the primary lever (FIGS. 7 and 8) are articulated with holes 52 in the connecting rod 17 by means of axles 51. The connecting rod is in the form of a fork which surrounds the jack 12, leaving a space. The articulation along the axles 51 constitutes the first working point A.

The holes 45 in the primary lever P receive an axle 53 carrying a roller 54 which cooperates with the end of the slide valve 23. The roller 54 constitutes the second working point B.

The heels 50 cooperate, by abutment, with a shoulder 55 on the interconnecting rod 15, the said rod possessing another shoulder 55A of larger diameter. In normal operation, the end 17A of the connecting rod 17 is separated from this shoulder 55A by a clearance J. The heels 50 constitute the third working point C.

The holes 44 in the primary lever P and the holes 48 in the secondary lever S are mutually articulated by means of an axle 56, which constitutes the intermediate point of articulation D between the levers P and S.

As regards the holes 49 in the secondary lever S, they receive axles 57 for pivoting on the fixed casing 28, and form the fixed fulcrum E.

It will be appreciated that the construction of the device which has now been described is particularly compact and effective, especially as regards the shape of the casing 28 which, in its right-hand part in FIG. 4, comprises the jack 12 and the distributor 22 in a superposed manner, and which, in its left-hand part in the said FIG. 4, contains the free space 30 in which the primary lever P and the secondary lever S, and also the interconnecting rod 15, are located.

Operation is as follows.

Provided the brake pedal 16 is not depressed (FIG. 1), the connecting rod 17 in the form of a fork exerts no action at A on the lever P; consequently, no action is exerted at B on the slide valve 23 of the distributor 22. The chamber 14 of the jack 12 is connected to the reservoir 31. There is no action on the interconnecting means 15, and the master piston 10 remains in the rest position. No braking takes place.

When the pedal 16 is depressed in order to brake, the connecting rod 17 pushes the point A towards the left, and this, via the movement of the levers P,S, has the result of pushing the slide valve 23 of the distributor 22 towards the right, at the point B, and thus of causing the pressure of the source 32 to develop in the chamber 14 of the jack 12 (FIG. 2). The interconnecting rod 15 is thus pushed towards the left by the piston 13 of the jack 12, and this actuates the master piston 10 to ensure braking. Simultaneously, the pressure delivered by the distributor 22 is set up in the chamber 21, which acts as a reaction chamber. The effect of the pressure in the chamber 21 is to develop a resistance which opposes the pushing of the slide valve 23, and via the levers P and S, to produce a feeling of force on the pedal 16, giving all the desired sensitivity to the maneuver.

It will be appreciated that the provision of the lever means in the form of two levers P and S mutually articulated at D, the primary lever P possessing the points A and B and the secondary lever S possessing the points E and C, makes it possible to provide the device with the optimum step-down ratio, whilst at the same time satisfying all the other desired conditions of construction and operation.

In the event of failure of the hydraulic pressure, braking is assured by the force on the pedal 16 after abutment of the end 17A of the connecting rod 17 against the shoulder 55A of the rod 15, the unit P,S becoming a single lever pivoted at E. During this auxiliary braking, there is no action on the piston 13 of the jack 12 and there is no risk that the piston will increase the force; for this purpose, the interconnecting rod 15 is simply linked to the piston 13 by means of a one-way stop 58, as shown in FIGS. 1 and 4.

In the embodiment which has now been described with reference to FIGS. 1 to 8, the primary lever P of the lever means P,S cooperates with the pedal 16 in an indirect manner because it cooperates via the connecting rod 17.

Figure 9:
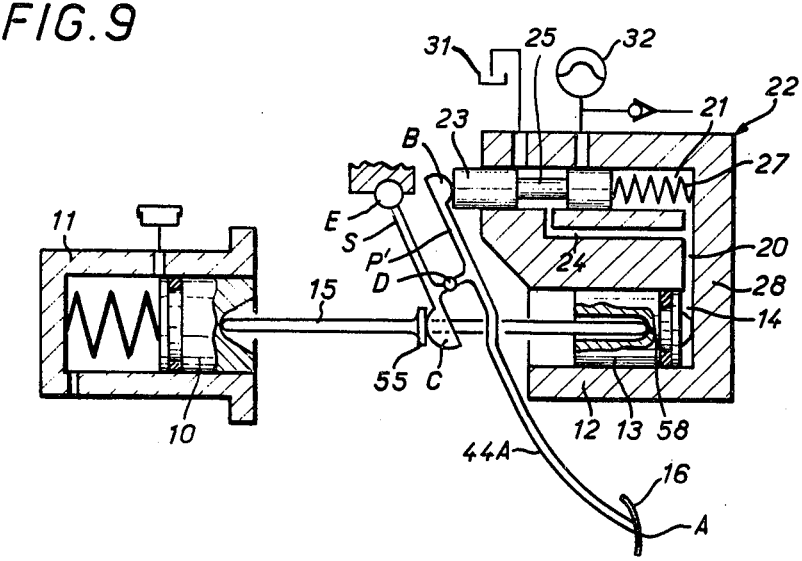
FIG. 9 is a similar view to FIG. 1, but shows a different embodiment.
Figure 10:
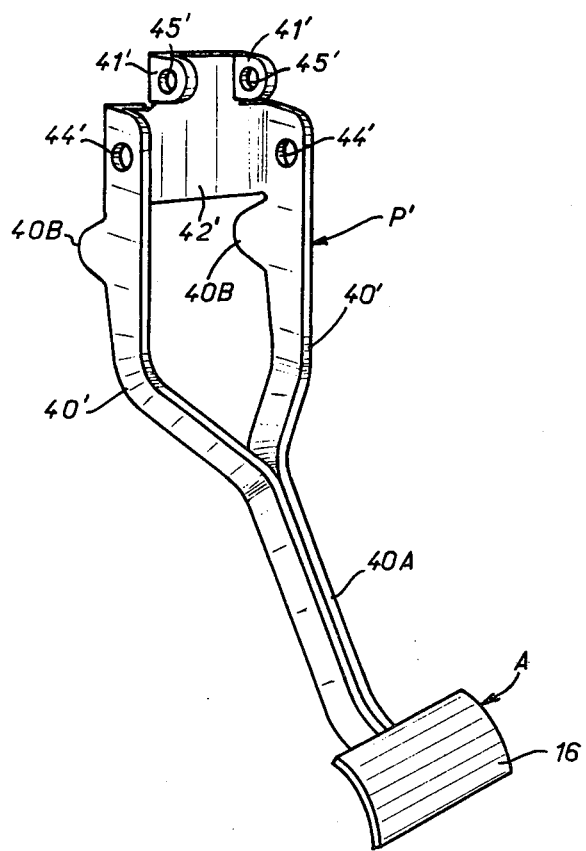
FIG. 10 is a perspective view, on a larger scale, of the primary lever of the embodiment of FIG. 9.

Reference will now be made to FIGS. 9 and 10, in which, as a variant, the primary lever is controlled directly by the pedal 16 and carries this pedal 16 at its end.

The primary lever, designated by P', has a construction (FIG. 10) which is similar to that described with reference to FIG. 8, and its various elements carry the same references followed by a prime.

FIG. 10 shows that the cheeks 40' are extended downwards so that the body 28 does not obstruct the movement of the lever P', and are then combined in a common section 40A which carries the pedal 16 at its end. The cheeks 40' in this case possess protuberances 40B which perform the function of the ends 17A of abutting against the shoulder 55 in the event of failure of the auxiliary system.

The general arrangement shown in FIG. 9 is furthermore analogous to that described with reference to FIGS. 1 to 8, and the same reference numerals have been adopted.

Operation is similar to that described above.

I claim:

1. In an assisted baking device comprising a master piston slidably mounted in a master cylinder, a jack having a jack piston, interconnecting means linking the jack piston and the master piston, a source of auxiliary hydraulic pressure and a distributor operable to feed the jack with auxiliary hydraulic pressure from said source and which is controlled in response to the actuation of control means comprising a brake pedal; the improvement in which said control means comprises also a primary lever and a secondary lever articulatedly interconnected between their ends at a point D, said primary lever cooperating with said brake pedal at a point A at one end of said primary lever and cooperating with said distributor at a point B at the other end of said primary lever, said secondary lever cooperating with said master piston at a point C at one end of said secondary lever and being articulatedly interconnected with a fixed support at a fixed point E at the other end of said secondary lever.

2. A device according to claim 1, wherein the primary lever and the secondary lever are each in the form of a yoke having a pair of side cheeks joined by a crosspiece, the cheeks being formed with holes in which are disposed articulation axles.

3. A device according to claim 2, wherein the primary lever has two pairs of superposed side cheeks with different spacings, between which the pair of cheeks of the secondary lever, with an intermediate spacing, are disposed.

4. A device according to claim 3, wherein the pair of cheeks of the primary lever with the greater spacing are formed with two holes which receive an axle at point D for articulation on the secondary lever, whilst the pair of cheeks of the primary lever with the smaller spacing are formed with two holes which receive a central axle which cooperates with the distributor, the pair of cheeks of the secondary lever possessing two holes receiving said axle of the primary lever, and two other holes receiving side axles forming the fixed fulcrum at point E, said pair of cheeks of the secondary lever additionally being formed with heels which cooperate with the master piston.

5. A device according to claim 1, comprising a parallelepipidal casing which is fixed to the master cylinder and which receives, at one side, the distributor and the jack, which are superposed, whilst, at the opposite side the casing is provided with a free space in which the primary lever, the secondary lever and the interconnecting means are housed.

6. A device according to claim 1, wherin the interconnecting means comprises an abutment collar which permits manual assistance in the event of failure of the auxiliary hydraulic system.

7. A device according to claim 6, wherein the interconnecting means are linked to the jack piston by a one-way stop.

8. A device according to claim 1, wherein the primary lever cooperates with the brake pedal via a connecting rod in the form of a frame.

9. A device according to claim 1, wherein the brake pedal is mounted directly on the primary lever.

10. A device according to claim 1, wherein the third working point C cooperates with the master piston via the interconnecting means.

* * * * *